Dec. 10, 1935.  K. E. LYMAN  2,023,690
AUTOMATIC CLUTCH
Filed Nov. 25, 1932  4 Sheets-Sheet 1
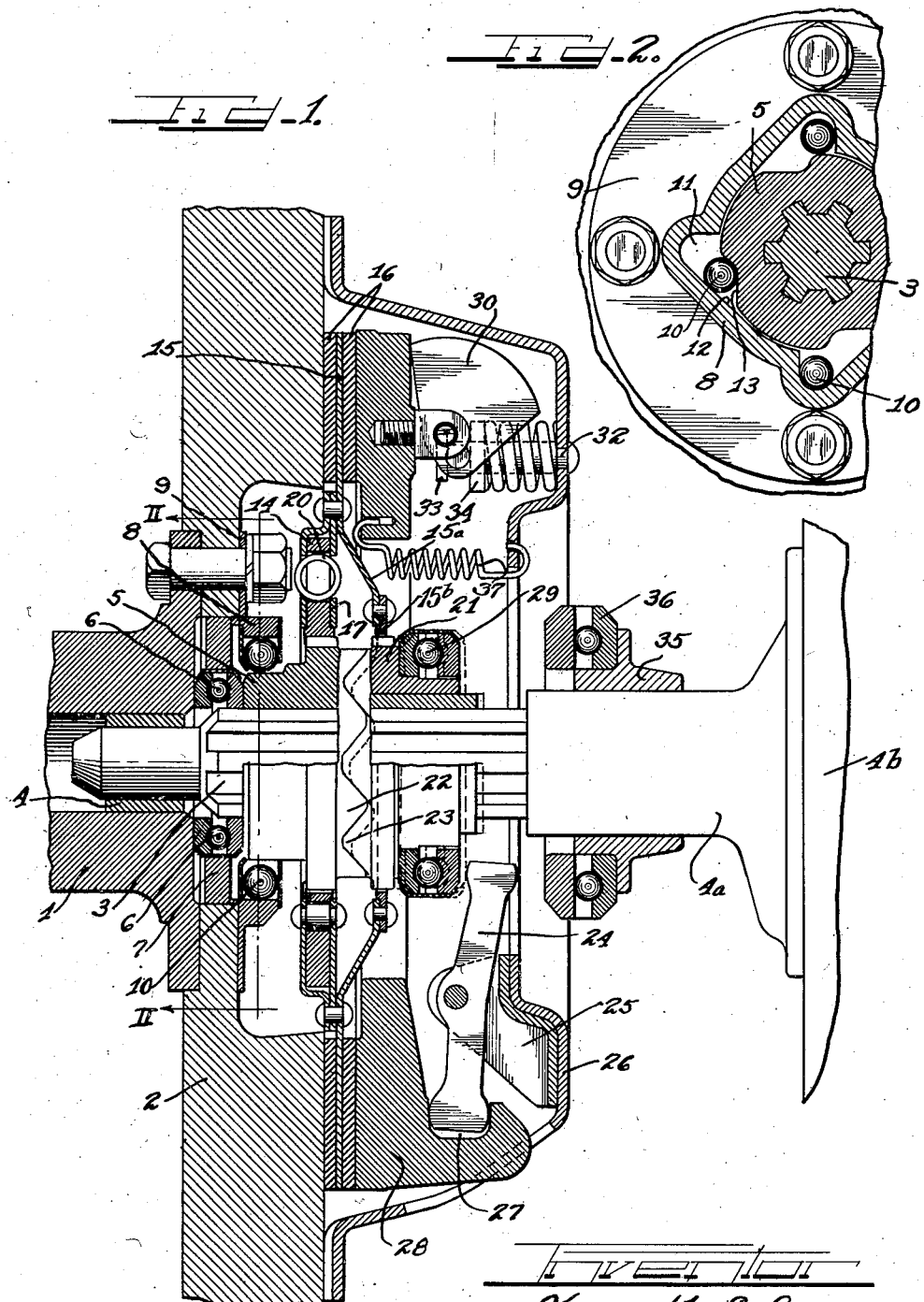
Inventor
Kenneth E. Lyman.

Dec. 10, 1935.  K. E. LYMAN  2,023,690
AUTOMATIC CLUTCH
Filed Nov. 25, 1932   4 Sheets-Sheet 2
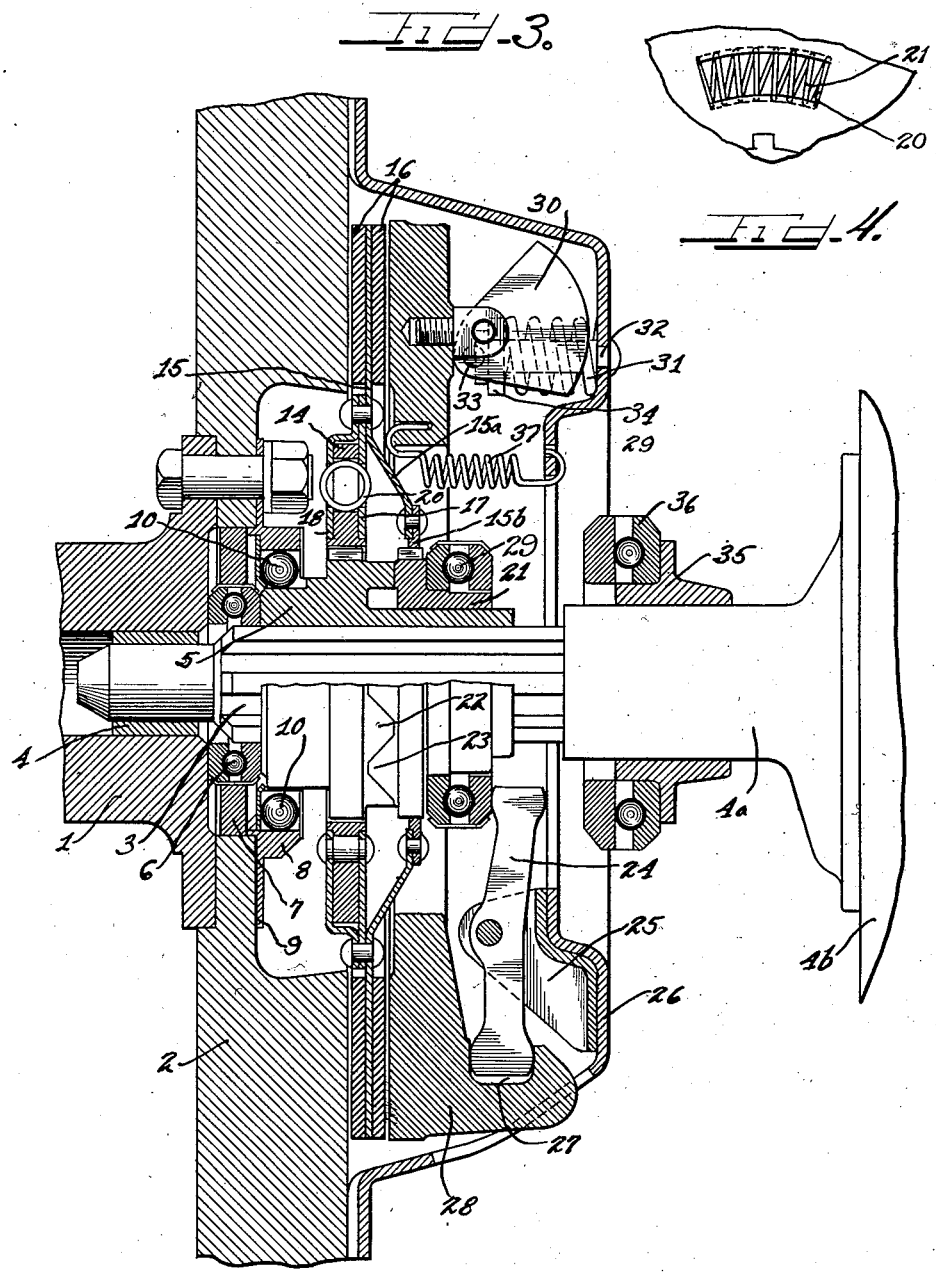
Inventor
Kenneth E. Lyman.
by Charles... Attys.

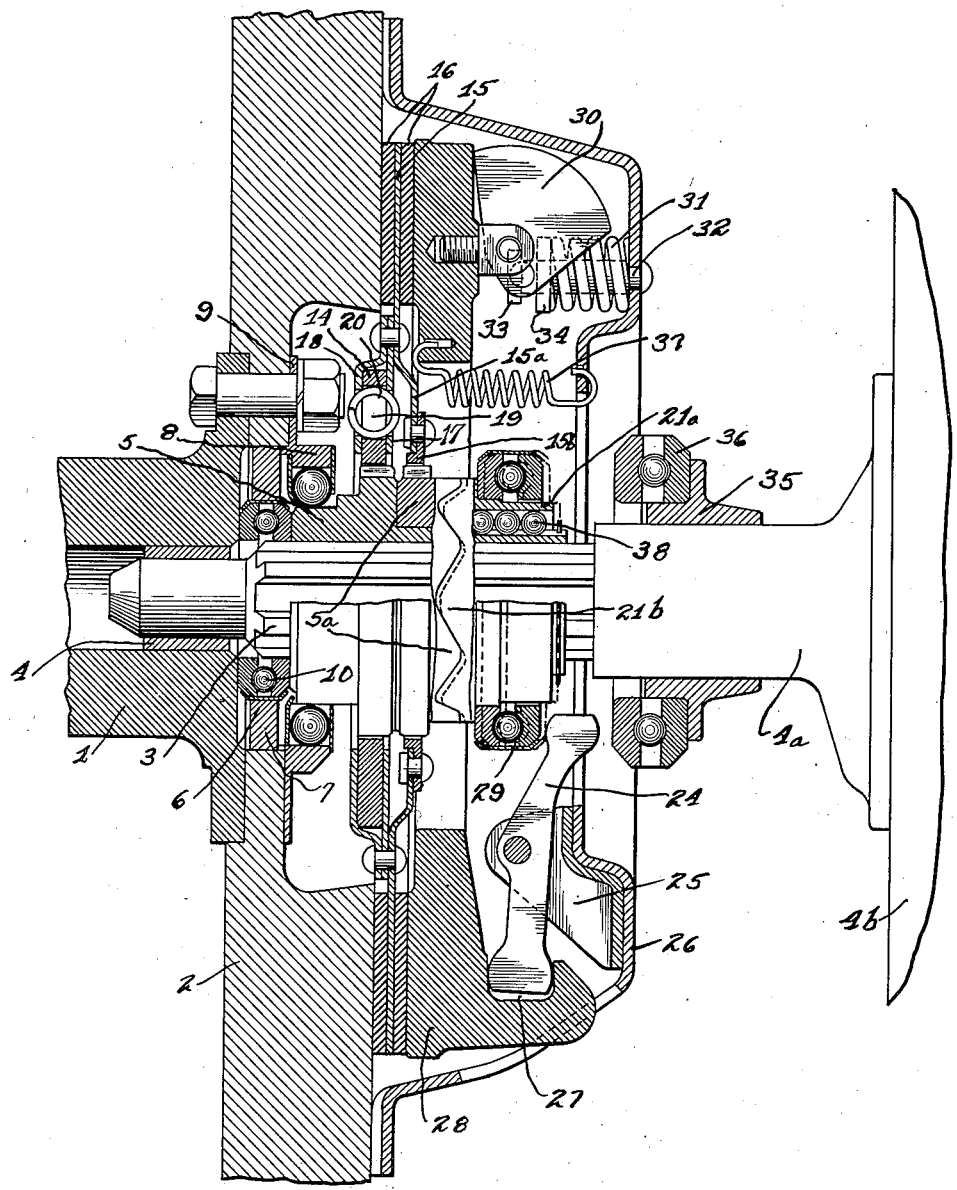

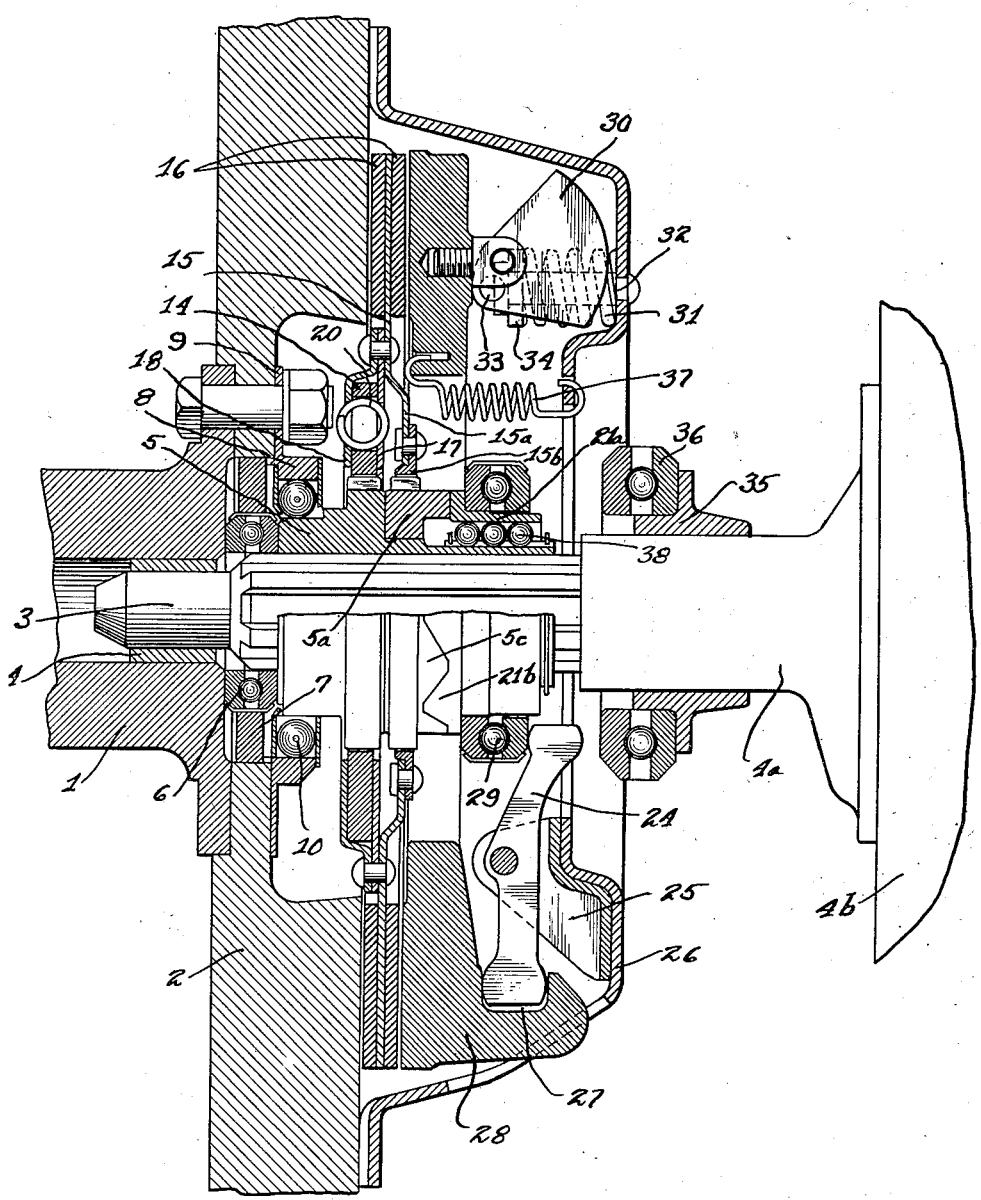

Patented Dec. 10, 1935

2,023,690

UNITED STATES PATENT OFFICE 2,023,690

AUTOMATIC CLUTCH

Kenneth E. Lyman, Rockford, Ill.

Application November 25, 1932, Serial No. 644,229

9 Claims. (Cl. 192—52)

This invention relates to an automatic clutch involving a friction plate, a camming member and a longitudinally shiftable cam member for increasing the pressure on the friction plate and concerns itself primarily with the connection between the friction member and camming member for producing longitudinal shifting movement of the cam member.

The invention comprises the novel structure, combination of parts hereinafter described and more particularly pointed out and defined in the appended claims.

In the accompanying drawings which illustrate a preferred embodiment of this invention and in which similar reference numerals refer to similar features in the different views:

Figure 1 is a sectional view through an automatic clutch involving this invention, showing the clutch in engaged position.

Figure 2 is an enlarged sectional view taken upon the line II—II of Figure 1 showing parts of a lock-up.

Figure 3 is a sectional view similar to Figure 1 illustrating the parts in different positions with the clutch elements in disengaged position.

Figure 4 is a fragmentary elevational view illustrating a yielding connection between one of the friction elements and the cam member.

Figure 5 is a sectional view through an automatic clutch involving this invention and illustrating a slight modification thereof.

Figure 6 is a view similar to Figure 5 showing the clutch in disengaged position.

In connection with this invention, there is illustrated a driving member 1 which may be the shaft of an internal combustion engine carrying the usual flywheel 2. A driven member in the form of a shaft 3 is mounted coaxially with the driving member 1 and is journalled in a bearing 4 located in the driving member and in a bearing 4a which may be attached to a casing 4b which may be a transmission casing. A camming member 5 is splined upon the shaft 3 and a thrust bearing 6 which is illustrated as a roller thrust bearing is positioned between the end of the camming member 5 and the end of the driving member 1. Preferably a filler block or ring 7 is interposed between the ball thrust bearing and the flywheel 2. A drum 8 which is attached by a flange 9 to the flywheel and which is concentric to the hub of the camming member 5 surrounds a plurality of balls 10 which are adapted to travel upon the camming member. With reference to Figure 2, it will be noted that the drum 8 is provided with ball pockets 11 and cam surfaces 12 adjacent each pocket while the surface of the camming member 5 is provided with ball depressions 13. This construction is commercially known as a "lock-up" and is designed to allow the driven shaft to rotate the drum and start the engine in the event that the latter dies down. A ring 14 is slidably splined upon the camming member 5 and yieldingly supports a friction plate member which consists of a central plate 15 and side plates 16. To the plate member 15 there is attached a plate 17 and a plate 18 which is offset from the plate 17 to form a groove for receiving the ring 14. The ring 14 and the plates 17 and 18 are provided with registering slots 19 in which a coil spring 20 is mounted. It will of course be understood that any number of coil springs may be used to yieldingly connect the friction member with the ring 14. According to this construction, the friction member may rotate a limited extent by compressing the spring 20 without rotating the ring 14.

A cammed member 21 is freely mounted upon the rear hub of the camming member 5 for relative rotation with respect thereto. The camming member 5 and the cammed member 21 have co-acting cam projections 22 and 23 respectively which are normally in engagement as shown in Figure 1. However, when there is relative rotation between these members, the member 21 is shifted longitudinally to the right for actuating the levers 24 (only one of which is shown) which are pivoted to lugs 25 on a casing 26 which is attached to the flywheel 2. The radially outer ends of the levers 24 engage in sockets 27 formed in a friction plate 28 which cooperates with the first described friction member. The actuation of the levers 24 by the cam member will, of course, gradually increase the pressure of the friction clutch member as is obvious. A section of the plate 15 is offset to the right as indicated at 15a and a ring 15b is attached to this offset portion. The ring 15b is slidably splined to the cammed member 21 which may be shifted without affecting the central plate 15 of the friction member. With this construction, it will be apparent that when the first described friction member rotates relative to the ring 14, the cammed member 21 will be freely rotated and be shifted toward the right due to the fact that the cam lugs 23 thereof ride outwardly upon the cam lugs 22. A ball thrust bearing 29 is preferably seated upon the cammed member 21 for engaging the radially inner ends of the levers 24 to decrease or eliminate the friction between the levers and said member.

The circular friction plate 28 is adapted to be initially engaged with the other friction member which is forced against the flywheel by suitable centrifugal weights 30 which act against compression springs 31. The coil compression spring 31 is mounted upon a bolt 32. One or more studs 33 movable with the centrifugal weights 30 are adapted for engaging a washer 34 upon the bolt 32 for compressing the spring 31 as the centrifugal weights fly outwardly. It will of course be understood that any number of centrifugal weights may be used for initially engaging the friction elements.

A slidable sleeve 35 carrying a thrust ball bearing 36 is mounted upon the bearing 4a and may be manually actuated for engaging the levers 24 for disengaging the clutch elements. This manually operated mechanism may be used to disconnect the clutch at any time. Normally, the clutch plate 28 may be disengaged by tension springs 37 which connect such plate with the casing 26.

The operation of that form of the invention shown in Figures 1 to 4 will now be described. Figure 3 illustrates the clutch in its nonoperative or disengaged position. While the clutch is disengaged the driving member 1, flywheel 2, casing 26, the pressure plate 28 and the parts carried by the casing 26 and pressure plate 28 may freely rotate relatively to the driven parts of the clutch. Such relative rotation of the parts named will continue so long as the speed of the engine driving the shaft 1 does not exceed a predetermined idling speed.

While the casing 26 is stationary or rotating at a speed not exceeding the predetermined idling speed of the engine, the centrifugal weights 30 will be in the radially inwardly retracted position illustrated in Figure 3 whereby that section of the weights 30 between their pivots and the studs 33 will be retracted from interposition between the springs 31 and the pressure plate 28. The springs 31, when thus released, exert less force upon the plate 28 than the springs 37 so that the force of springs 37 predominates to maintain the plate 28 out of engagement with the driven friction member comprising the central plate 15 and the side plates 16. It will be seen that normally the springs 37 are the dominating springs and that the springs 31 are the dominated springs.

When the engine is increased in speed above said predetermined idling speed pursuant to starting the vehicle, the inertia weights 30 will be thrown radially outwardly whereby the studs 33 approach alinement with the pivots of the inertia weights and the heads of bolts 32 anchored in the casing 26, thus compressing the springs 31 and increasing their force to such an extent that it overcomes the opposing force of the normally dominative springs 37 and projects the pressure plate 28 into light engagement with the clutch driven friction member 15—16. This light engagement of the friction members is referred to herein as their "initial" engagement. When initially engaged the driven friction member tends to follow the rotative movement of the flywheel 2 and pressure plate 28. The driven shaft 3 will resist movement of the ring 14 but the springs 20 permit of the parts 15 and 15a being rotated a short arcuate distance with respect to said ring and the driven shaft 3. This relative rotation of the plate 15a causes movement of the cammed member 21 relative to the camming member 5 and projection of the cammed member 21 to the right, Figure 3. Movement of the cammed member 21 to the right, axially of the driven shaft 3 and of the camming member 5, is permitted by the splined connection between the plate 15a and said cammed member.

Movement of the cammed member 21 to the right imparts a like movement to the thrust bearing 29 which pivots the levers 24 to cause them to exert a force upon the pressure plate 28 in the direction of the flywheel 2. In this manner the overbalanced force of springs 31 and 37 holding the friction members in light engagement is augmented to provide a power driving engagement of the clutch friction members.

It will be noted that the power transmitting engagement between the friction members of the clutch is maintained whether power is being transmitted from the drive shaft 1 to the driven shaft 3 or whether the power is being transmitted from the shaft 3 to shaft 1. Power is transmitted from the driven shaft to the driving shaft at such times as when the motor of the vehicle is employed as a brake. While power is being delivered from the shaft 1 to shaft 3 the springs 20 will be compressed and one series of complementally opposed faces of the cam projections 22 and 23 will cause movement of the cammed member 21 to the right. Meanwhile the other set of opposed faces of the cam projections 22 and 23 will be separated as illustrated by the dotted lines in Figure 1. When power is no longer delivered by the driving member 1 the springs 20 will no longer be compressed and will expand to shift the cam member 21 back to the position shown in Figure 3. Upon a decrease in engine speed there will be a tendency for the driven shaft 3 to drive the shaft 1 and again compress the springs 20 incident to causing relative rotation between the cam members 5 and 21 in the opposite direction thereby bringing together the complemental camming surfaces shown separated in Figure 1. Again the member 21 will be cammed to the right incident to separation of the complemental camming surfaces shown together in Figure 1. That is, whether the relative movement between the members 5 and 21 is caused by the driving action of the shaft 1 or by the braking action transmitted through the shaft 3, the cammed member 21 will be forced to the right to effect the power drive connection between the friction elements of the clutch.

The operation of the lock-up mechanism is as follows: Normally the lock-up mechanism is inoperative. Never does it affect the automatic operation of the friction clutch. Assume the flywheel 2 and the drum 8 attached thereto to be rotating at engine idling speed. The inertia weights 30 will be in their inwardly retracted position shown in Figure 3 and the friction clutch members will be disengaged. Rotation of the flywheel 2 and of the drum 8 is counterclockwise, as viewed in Figure 2. It becomes apparent upon an examination of Figure 2 that the balls 10 will be thrown outwardly into the ball pockets 11 where they will be ineffective to establish a driving connection between the driving shaft 1 and the cam member 5 which is splined to the driven shaft 3. When thus held centrifugally within the pockets 11 the balls 10 are completely out of contact with the uneven surface of the cam member 5 containing the ball depressions 13 and consequently no noise results from contact between the balls 10 and such surface. So long as the flywheel 2 and the drum 8 continue to rotate, the balls 10 will be retained in the ball pockets 11 whether or not the friction clutch members are engaged.

If it should be desired to start the motor of the vehicle by supplying power from the running gear, the vehicle may be moved forwardly as by an external force, vehicle momentum or the force of gravity thereby causing the shaft 3 and cam member 5 to rotate in a counterclockwise direction relatively to the drum 8. This tendency of relative counterclockwise rotation will be prevented, however, by the balls 10 lodging between the ball depressions 13 in the cam member 5 and the cam surfaces 12 of the drum 8. This lock-up of the balls 10 will cause the drum 8, the driving shaft 1 and the engine to rotate with the driven shaft 3.

When the flywheel 2 is rotating at a speed at which the weights 30 are thrown outwardly to effect the initial engagement between the friction elements free-wheeling is prevented by the action of the cam members 5 and 21 as previously explained. The lock-up mechanism serves to prevent free-wheeling when the flywheel is not rotating or is rotating at a speed insufficient to create a connection between the clutch friction elements.

Referring now to Figures 5 and 6, it will be observed that the structure therein illustrated is substantially similar to that illustrated in the other figures. The points of difference between the structures illustrated in Figs. 5 and 6 and the other figures will now be set forth. In this modified form of the invention, the cam member is represented by the reference numeral 21a and it will be noted that it is slidably splined upon the sleeve of the membr 5 by means of ball bearings 38 and does not rotate relative to the member 5 as in the first form. In this modified form of the invention, the member 5 carries a special camming ring 5a which is rotatably mounted upon a hub of the member 5. This special camming ring 5a is slidably splined to the aforementioned plate 15b which is attached to the friction member consisting of the parts 15 and 16. The camming ring 5a and the cam ring 21a have interengaging cam projections, 5c and 21b, with the result that when the ring 5a rotates relatively to the cam ring 21a the latter will be longitudinally shifted for actuating the levers 24 for gradually applying the friction element and increasing the pressure over that which is obtained by the initial application of said element by the centrifugal weights.

From the foregoing, it will be appreciated that the driving force of the friction member 15 is partially carried by the resilient springs 20 and partially by the camming action between the camming ring and the cammed ring.

The principle of operation of the embodiment of the invention shown in Figures 5 and 6 is very similar to that of the embodiment shown in Figures 1 to 4. As has been explained above, when the weights 30 are in their retracted position the overbalanced force of springs 31 and 37 acting upon the pressure plate 28 holds the plate away from engagement with the driven friction element comprising the plate 15. Incident to an increase in speed of the flywheel 2 the centrifugal weights 30 are thrown outwardly to effect the initial engagement of the pressure plate 28 and the driven friction element. When initially engaged the outer peripheral section of the driven friction element, or the plate 15 and off-set section 15a, is rotated relatively to the hub portion or ring 14 of said element, such relative rotation being permitted by the springs 20 which then become compressed. The ring 14 is held against rotation by the member 5 which is keyed to the driven shaft 3. The camming ring 5a upon the sleeve portion of member 5, by virtue of the splined connection with the offset section 15a of the plate 15, is rotated relatively to the member 5 during the compression of the spring 20. During rotation of the cam ring 5a the cam member 21a, which is splined to the sleeve portion of the member 5, is held against rotation and is projected to the left by the coaction of the cam projections 5c and 21b. Movement of the cam member 21a to the right causes a like movement of the thrust bearing 29 whereby the fingers 24 are pivoted for pressing the pressure plate 28 against the driven friction element and thereby establishing a driving load connection between the driven friction element, flywheel 2 and the pressure plate 28.

If, while the vehicle is in motion, the driving power of shaft 1 is relieved so that no torque is being delivered through the clutch, the springs 20 will expand and, if the driven shaft 3 then has a tendency to rotate faster than the drive shaft 1, the springs 20 will be recompressed coincidental to a relative movement between the cammed member 21a and the cam ring 5a in a direction opposite to the relative movement between said members when the fingers 24 were initially actuated for moving the pressure plate 28 into driving relation with the driven friction element. It makes no difference which way the relative movement between the cam members 5a and 21a occurs; that is, whether the ring 5a is held relatively stationary while the driven member 3 and the members 5 and 21a are turned relatively thereto, or whether the parts 5 and 21a are held relatively rotatably stationary while the ring cam 5a is rotated. Either method of causing the relative rotation of the cam members 5a and 21a will cause an axial movement of the cam member 21a for effecting through the thrust bearing 29 and the fingers 24 a driving pressure to be applied by the pressure plate 28 upon the driven friction element.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a friction clutch mechanism, a driving clutch member, a cooperating clutch member, levers for actuating said cooperating clutch member, a pair of relatively rotatable cam members, a spring connection between said driving clutch member and one of said relatively rotatable cam members, and a connection between said driving clutch member and the other relatively rotatable member.

2. In a clutch mechanism, a pair of friction plates, a pair of relatively rotatable cam members, respective connections between one of said plates and said cam members, the connection to one of said cam members being resilient, and means whereby relative rotation of said members will actuate the other friction plate.

3. In an automatic clutch comprising a pair of friction plates, mechanism for gradually increasing the pressure between said friction plates including a pair of relatively rotatable cam members, connections between one of said friction plates and both of said cam members, one of said connections comprising yielding means in series therewith for allowing relative rotation of said members.

4. In an automatic clutch comprising a pair of friction plates, means for gradually increasing the resistance of said friction plates including a pair of relatively rotatable cam members, a spring connection between one of said friction plates and one of said cam members and a slidable connection between said friction plate and the other cam member.

5. In an automatic clutch, a driving member including a flywheel, a friction member for engaging said flywheel, a driven member, a hub splined upon said driven member, a longitudinally shiftable cam member upon said hub, a friction plate cooperating with said friction member, means actuated by said cam member for moving said friction plate, a yielding connection between said friction member and hub and a connection between said friction member and cam member.

6. In an automatic clutch, a driving member including a flywheel, a friction member for engaging said flywheel, a friction plate cooperating with said friction member, a driven member, a pair of relatively rotatable elements surrounding said driven member, a yielding connection between said friction member and one of said elements, a connection between said friction member and the other element, and means for moving said friction plate through the relative rotation of said elements.

7. A friction clutch mechanism comprising a driven shaft, a driving clutch member for said shaft, a cooperating clutch member, said clutch members being relatively movable into and out of engagement, a pair of complemental cams, one of said cams being fixed with respect to said shaft and the other of said cams being movable with respect thereto, a yielding driving connection between said driving clutch member and said shaft, an unyielding driving connection between said driving member and said movable cam member, and means for creating an effective engagement between said clutch members and actuated by said movable cam.

8. A friction clutch mechanism comprising driving and driven friction elements, a driven rotatable member, relatively movable complemental cams on said driven member, one of said cams being nonrotatable and the other being rotatable on said driven member, a yielding driving connection between the nonrotatable cam and the driven friction element, a relatively nonyieldable driving connection between the driven friction element and the rotatable cam, centrifugally actuated means for causing an initial engagement of said friction elements and relative movement of said cams during rotation of said driving friction element, and cam actuated means for effecting a power drive engagement of said friction elements, said cam actuated means being actuated by said cams incident to such relative movement thereof.

9. In a friction clutch, driving and driven friction elements, relatively movable complemental cam members, a yieldable operative connection between the driven element and one of said cam members, a relatively nonyieldable operative connection between the driven element and the other of said cam members, said connections effecting a relative movement of said cam members incident to an initial movement of said driven element, inertia means for effecting an initial engagement between said friction elements to cause such initial movement of said driven element, and cam actuated means for effecting a power drive connection between said friction members, said cam actuated means being actuated by said cam members incident to such relative movement thereof.

KENNETH E. LYMAN.